(12) United States Patent
Hiraike

(10) Patent No.: US 9,241,088 B2
(45) Date of Patent: Jan. 19, 2016

(54) IMAGE FORMING APPARATUS, IMAGE FORMING SYSTEM, IMAGE FORMING SYSTEM CONTROL METHOD, AND PROGRAM

(71) Applicant: CANON KABUSHIKI KAISHA, Tokyo (JP)

(72) Inventor: Kou Hiraike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/801,593

(22) Filed: Jul. 16, 2015

(65) Prior Publication Data

US 2015/0319334 A1 Nov. 5, 2015

Related U.S. Application Data

(63) Continuation of application No. 13/471,330, filed on May 14, 2012, now Pat. No. 9,118,793.

(30) Foreign Application Priority Data

May 20, 2011 (JP) .................................. 2011-113828

(51) Int. Cl.
*G06F 3/12* (2006.01)
*H04N 1/32* (2006.01)
*H04N 1/00* (2006.01)
*G06K 15/00* (2006.01)

(52) U.S. Cl.
CPC .......... *H04N 1/32635* (2013.01); *G06F 3/1296* (2013.01); *H04N 1/001* (2013.01); *H04N 1/32021* (2013.01); *G06K 15/00* (2013.01); *H04N 2201/0024* (2013.01); *H04N 2201/0082* (2013.01); *H04N 2201/0093* (2013.01); *H04N 2201/0094* (2013.01)

(58) Field of Classification Search
USPC .............. 358/1.13, 1.14, 1.15, 501, 505, 401, 358/402, 407, 442
See application file for complete search history.

*Primary Examiner* — Vu B Hang
(74) *Attorney, Agent, or Firm* — Canon U.S.A., Inc. IP Division

(57) ABSTRACT

An image forming apparatus includes a receiving unit configured to receive data via a network, a printing unit configured to print an image based on the data received from the receiving unit, and a control unit configured to control the receiving unit to refuse a data reception based on a simple mail transfer protocol (SMTP) when a toner remaining amount for the printing unit is less than a predetermined value, wherein the printing unit is configured to print, in the case that the receiving unit receives page description language (PDL) data, an image based on the received PDL data even if the toner remaining amount is less than the predetermined value.

11 Claims, 7 Drawing Sheets

FIG.2

230 TRANSFER SETTING TABLE

| FAX NUMBER | TRANSFER DESTINATION IP ADDRESS | TRANSFER RETRY NUMBER |
|---|---|---|
| 012-345-6789 | 111.222.333.444 | 30 SECONDS × 3 TIMES |
| 012-345-6788 | 111.222.333.555 | 20 SECONDS × 5 TIMES |
| 012-345-6787 | 111.222.333.666 | 60 SECONDS × 4 TIMES |

FIG.3

```
Date: Wed, 11 May 2011 12:00:00+0900
From: MFP@canon.co.jp
To: SFP@canon.co.jp
Subject: FAX
Message-Id: <20110511120000@canon.co.jp>
MIME-Version: 1.0
Content-Type: multipart/mixed; boundary="-----AAABBBCCCDDDEEE"
X-Canon-Fax: ON
```
⎬ 700

```
-----AAABBBCCCDDDEEE
Content-Type: Text/plain;charset="ISO-2022-JP"
Content-Transfer-Encoding: 7bit This is a sample of E-mail.
```
⎬ 701

```
-----AAABBBCCCDDDEEE
Content-Type: application/octet-stream;name="image1.tif"
Content-Transfer-Encoding: base64
Content-Disposition: attachment; filename="image1.tif"

[TIFF DATA]
```
⎬ 702

```
-----AAABBBCCCDDDEEE
Content-Type: application/octet-stream;name="image2.jpg"
Content-Transfer-Encoding: base64
Content-Disposition: attachment; filename="image2.jpg"

[JPEG DATA]

-----AAABBBCCCDDDEEE
```
⎬ 702

FIG.4
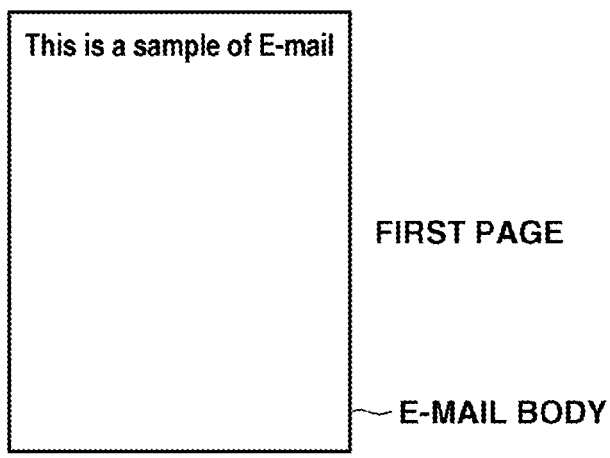
FIRST PAGE
E-MAIL BODY
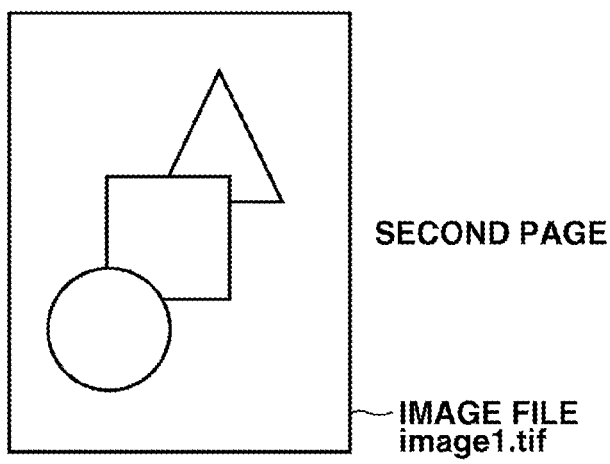
SECOND PAGE
IMAGE FILE
image1.tif
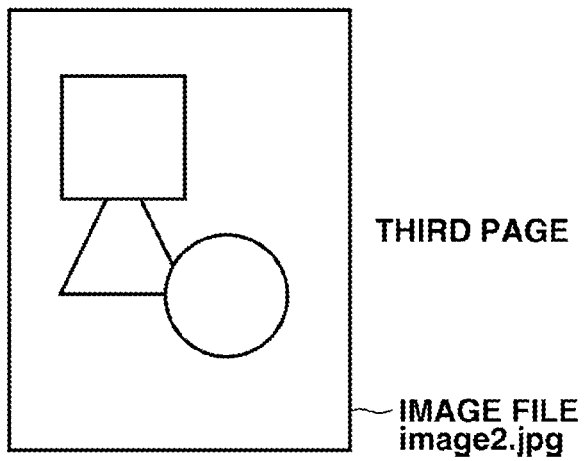
THIRD PAGE
IMAGE FILE
image2.jpg

IMAGE FORMING APPARATUS, IMAGE FORMING SYSTEM, IMAGE FORMING SYSTEM CONTROL METHOD, AND PROGRAM

CROSS REFERENCE TO RELATED APPLICATIONS

This application is a Continuation of U.S. patent application Ser. No. 13/471,330 filed on May 14, 2012, which claims the benefit of Japanese Application No. 2011-113828 filed May 20, 2011, which are hereby incorporated by reference herein in their entirety.

BACKGROUND OF THE INVENTION

1. Field of the Invention

The present invention relates to an image forming system configured from a data communication apparatus that transmits electronic mail data generated based on facsimile data received via a public line and an image forming apparatus that forms an image based on that electronic mail data.

2. Description of the Related Art

Conventionally, an image forming apparatus that has a facsimile function for transmitting and receiving facsimile data via a public line has been generally known. Further, in recent years Internet facsimile apparatuses (hereinafter sometimes also referred to as "Internet FAX apparatus") have been also becoming commonplace as a facsimile apparatus capable of performing facsimile communication via the Internet using an electronic mail protocol. An Internet FAX transmits data by using an electronic mail protocol (simple mail transfer protocol ("SMTP")) instead of a telephone line, and is recommended by the International Telecommunication Union (ITU).

An Internet FAX apparatus can utilize the Internet or an intranet to transmit and receive a facsimile. Compared with a facsimile apparatus that utilizes a telephone line, an Internet FAX apparatus can realize a reduction in communication costs, can computerize paper documents by a simple operation equivalent to a facsimile, and can attach that computerized document to an electronic mail and transmit it to a personal computer. Under an Internet FAX apparatus standard called "simple mode", image data with an A4 printing paper size and 200 dots per inch (dpi) printing resolution can be transmitted from the Internet FAX apparatus to a printer, and the image data received by the printer can be printed out.

Further, the above-described image forming apparatus can also receive and print out electronic mail other than electronic mail transmitted based on the Internet FAX standard. Moreover, in addition to the electronic mail receiving function, the above-described image forming apparatus may include a function for printing print data generated by a printer driver on a personal computer (PC) received via a network. Such a printer can also print electronic mail and page description language (PDL) data received in parallel.

Japanese Patent Application Laid-Open No. 2002-64670 discusses a FAX apparatus that restricts printing when a toner remaining amount is less than a predetermined value in order to prevent a print product from becoming faint due to lowering of the toner remaining amount.

When printing the received PDL data, although printing can be repeated by re-transmitting the data from the PC, if the received data is electronic mail data, since the sender and the receiver are different, in many cases it is impossible for the receiver to re-transmit and print the data.

Consequently, if printing is prohibited across the board regardless of the type of data when the toner remaining amount falls below the predetermined value as carried out in the conventional method, when receiving and printing the print data, printing is restricted despite the fact that a few pages can be printed even though the toner remaining amount has fallen below the predetermined value. Consequently, user convenience is dramatically reduced.

SUMMARY OF THE INVENTION

The present invention is directed to providing means for restricting printing depending on the type of data.

An image forming apparatus includes a receiving unit configured to receive data via a network, a printing unit configured to print an image based on the data received from the receiving unit, and a control unit configured to control the receiving unit to refuse a data reception based on a simple mail transfer protocol (SMTP) when a toner remaining amount for the printing unit is less than a predetermined value, wherein the printing unit is configured to print, in the case that the receiving unit receives page description language (PDL) data, an image based on the received PDL data even if the toner remaining amount is less than the predetermined value.

According to the present invention, image formation can be suitably restricted based on the type of data that is received via a network.

Further features and aspects of the present invention will become apparent from the following detailed description of embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

FIG. 2 is a configuration diagram of a transfer setting table stored in the MFP, illustrating data transfer to the SFP.

FIG. 3 is a data configuration diagram of an electronic mail.

FIG. 4 is a print example of the electronic mail illustrated in FIG. 3.

DESCRIPTION OF THE EMBODIMENTS

Various exemplary embodiments, features, and aspects of the invention will be described in detail below with reference to the drawings.

An embodiment of the present invention will now be described using the drawings.

Figure 1:
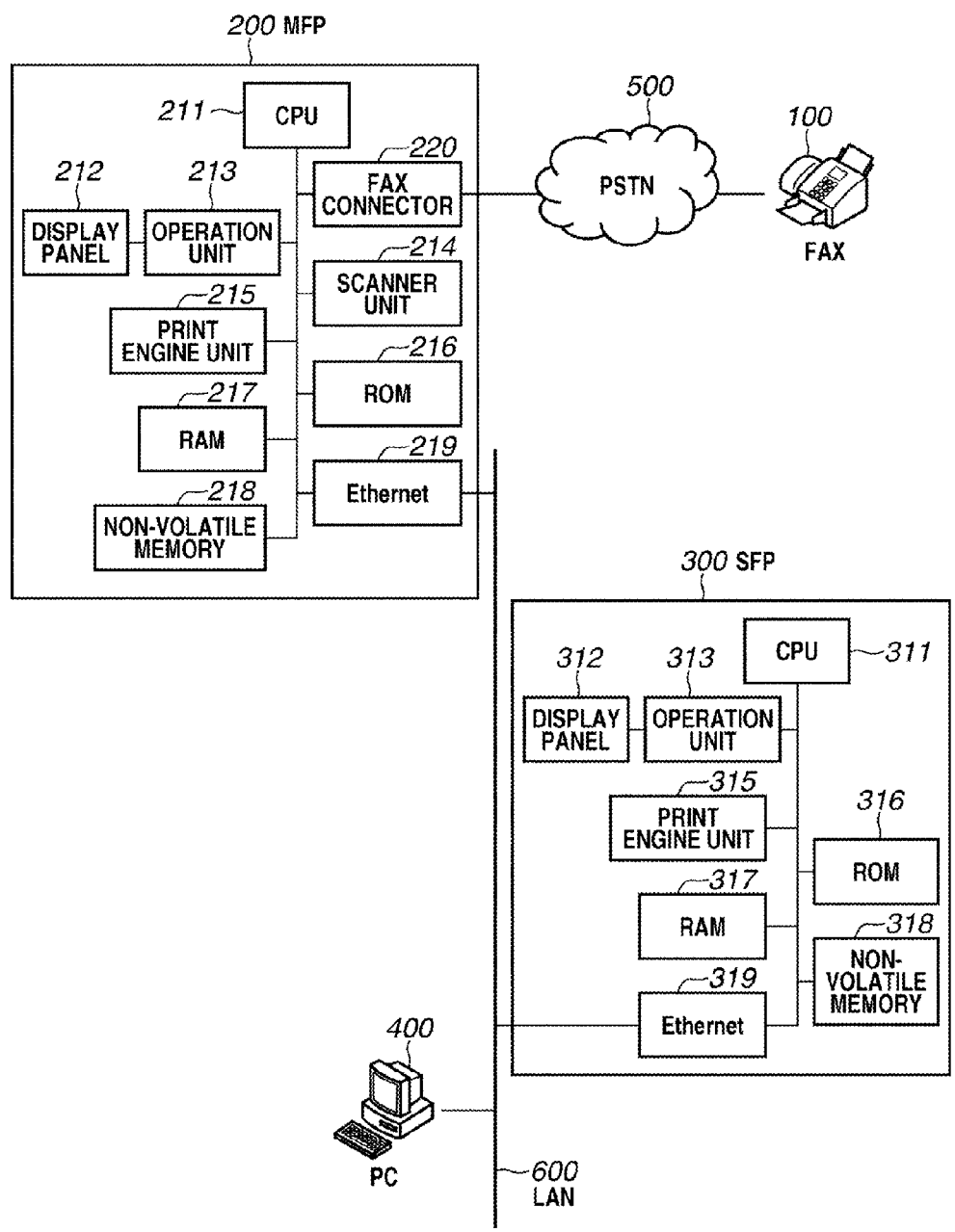
FIG. 1 illustrates a configuration of a network system configured from a PC, a multi function peripheral (MFP), and a single function peripheral (SFP).

FIG. 1 is a block diagram illustrating a configuration of an image forming system according to the present embodiment. This image forming system is configured from a facsimile apparatus 100 (hereinafter, "FAX apparatus") for transmitting facsimile data, an MFP 200 that includes a plurality of functions, such as a facsimile function, a print function, and an E-mail transmission function, a single function apparatus (hereinafter, "SFP") 300 for printing, and a versatile personal computer (hereinafter, "PC") 400. In the present embodiment, the MFP is described as an example of a data communication apparatus, and the SFP is described as an example of an image forming apparatus.

The FAX apparatus 100 and the MFP 200 are connected by a public switched telephone network (PSTN) or an integrated service digital network (ISDN).

The MFP 200, the SFP 300, and the PC 400 are communicably connected to each other on a local area network (LAN) 600.

The MFP 200 has a plurality of FAX lines and FAX numbers. Further, the MFP 200 can set one transfer destination apparatus per FAX number, so that the facsimile data received by the MFP 200 can be transferred to different transfer destinations.

The MFP 200 can convert the facsimile data received from the FAX apparatus 100 into image data in a file format that can be printed by the SFP 300, attach the image data to an electronic mail as an image file, and transfer that electronic mail to the SFP 300 via the LAN 600. In this data transfer, the image data is directly transferred to the SFP 300 without going via an electronic mail server by using an electronic mail transmission protocol called "simple mail transfer protocol" (SMTP).

The MFP includes a function called "direct SMTP", which enables the MFP to transmit image data generated by reading a document with a scanner by electronic mail using the SMTP protocol, and to make the SFP 300 print the image data.

The SFP 300 receives the electronic mail data via the LAN 600, and prints the received data. At this stage, if the received electronic mail data was transferred from the FAX apparatus 100 via the MFP 200, the SFP 300 prints the image file attached to the electronic mail data. If the data was not received in this manner, the SFP 300 prints the body text of the electronic mail and the attachment image file. Further, the SFP 300 can also receive and print PDL data transmitted from a printer driver in the PC 400.

The data that flows through the LAN 600 is transmitted based on a transmission protocol up to the transport layer called transmission control protocol/Internet protocol (TCP/IP). Further, the electronic mail data can be transmitted and received by using SMTP as an upper layer communication protocol.

Next, a hardware configuration of the MFP 200 will be described. A central processing unit (CPU) 211 controls the MFP 200. A read-only memory (ROM) 216 stores program codes for controlling the CPU 211, a display panel 212, an operation unit 213, a scanner unit 214, and a print engine unit 215. By using a rewritable flash ROM for the ROM 216, the program codes stored in the ROM can be updated. A random access memory (RAM) 217 can be used to serve as a work memory for the control program codes, as well as to temporarily store images to be output for print to the print engine unit 215. A non-volatile memory 218 temporarily stores the received facsimile data, electronic mail, and attached image files. The non-volatile memory 218 is configured from a hard disk drive (HDD), a flash ROM and the like.

The print engine unit 215 performs image formation based on the image data. The print engine unit 215 acquires a remaining amount of toner required for image formation at periodic intervals, or when one image page is printed, or when toner is replenished. The acquired toner remaining amount is stored in the RAM 217.

The scanner unit 214 reads a document and converts it into image data. Various keys for receiving operations from the user are provided on the operation unit 213, so that the user can issue execution instructions for the various programs. The display panel 212 displays operation screens for functions, settings and the like. Electronic mail data generated from the image data converted by the scanner unit 214 can also be transmitted to an external device.

An Ethernet® interface 219 for connecting to the LAN 600 can transmit and receive electronic mail data and PDL data.

Via a FAX connector 220 for connecting to a public switched telephone network (PSTN) 500, facsimile data from the FAX apparatus 100 can be transmitted and received.

Figure 7:
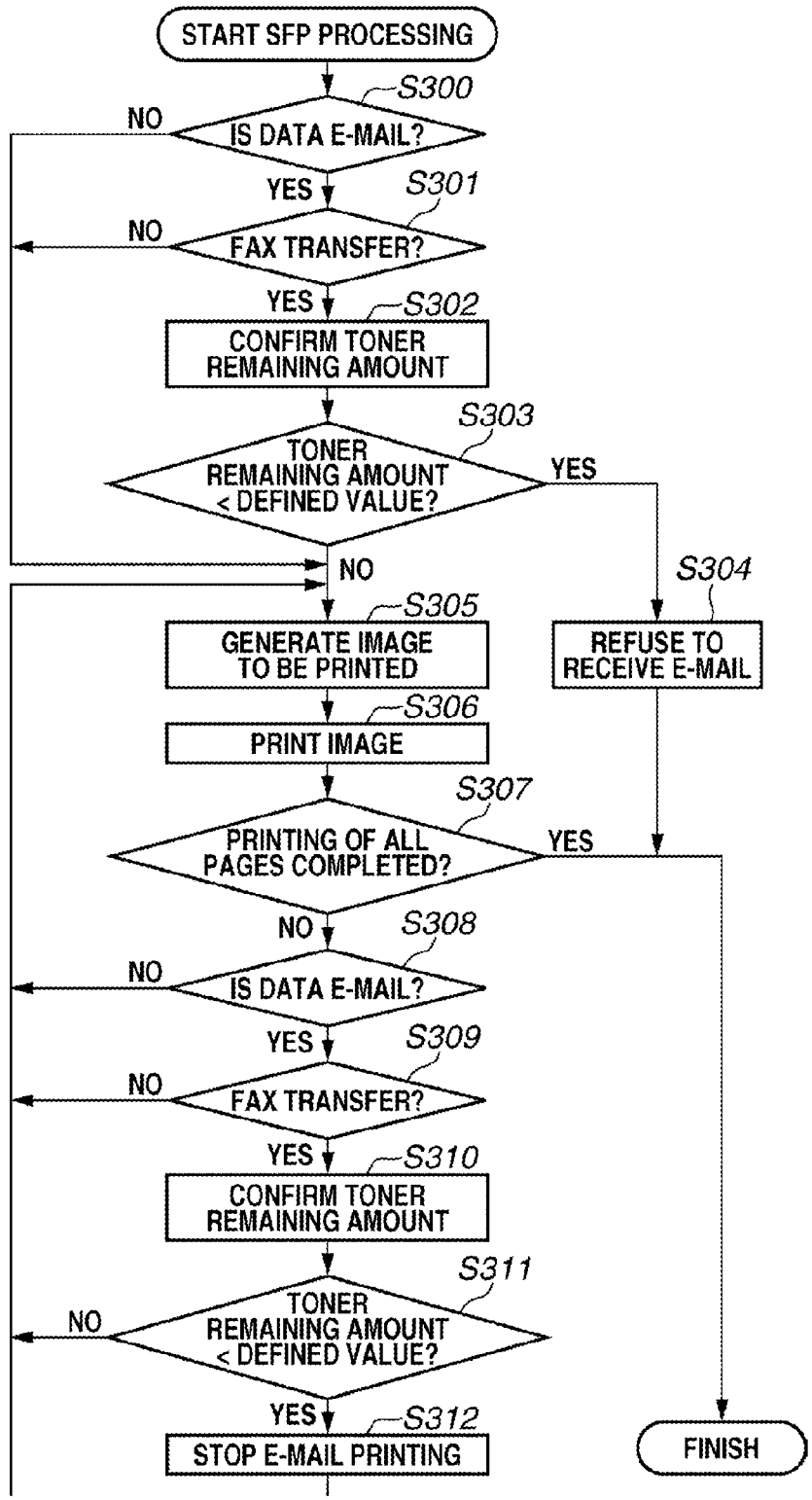
FIG. 7 is a flowchart illustrating the processing performed by the SFP of FIG. 1.

Next, the parts of the hardware configuration of the SFP 300 that are different from the MFP 200 will be described. A CPU 311 controls the SFP 300. A control program for executing the processing described below in FIG. 7 is stored in the CPU 311. A display panel 312 displays functions and settings. An operation unit 313 issues execution instructions for the various programs. A print engine unit 315 is configured to print image data. A ROM 316 stores program codes for controlling the CPU 311, the display panel 312, the operation unit 313, and the print engine unit 315. A RAM 317 can be used to serve as a work memory for the control program codes, as well as to temporarily store images to be printed by the print engine unit 315. A non-volatile memory 318 temporarily stores electronic mail and attached image files. An Ethernet® interface 319 for connecting to the LAN 600 can transmit and receive electronic mail data and PDL data.

The overall configuration of the system according to the present embodiment was described above. Next, an operation will be described in which the MFP 200 transfers facsimile data transmitted from the FAX apparatus 100 to the SFP 300 by electronic mail, and performs printing based on the transferred electronic mail with the SFP 300.

FIG. 2 is a table illustrating a facsimile data transfer setting stored in the non-volatile memory 218 of the MFP 200. The transfer setting table 230 is used to check a reception condition to determine whether facsimile data received from the FAX apparatus 100 should be printed by the MFP 200 itself or should be transferred to another apparatus. Further, the transfer setting table 230 is referred to in order to specify the transfer destination apparatus when transferring facsimile data.

The transfer setting table 230 is configured from FAX numbers, transfer destination IP addresses, and transfer retry numbers. When facsimile data is received as to a FAX number, data transfer is performed to the apparatus set as the transfer destination IP address based on SMTP, which is the protocol used for electronic mail data transfer.

If a session cannot be established during data transfer, specifically, if an SMTP session start request is refused by the transfer apparatus, the MFP 200 again tries to transfer the data. The number of times that the MFP 200 retries transfer of the data is set by the transfer retry number. If the number of retries exceeds the set value for the transfer retry number, the MFP 200 stops data transfer, and performs proxy printing by itself.

The FAX numbers, the transfer destination IP addresses, and the transfer retry numbers set in the transfer setting table 230 can be freely rewritten via the display panel 212 and the operation unit 213. Further, these settings can also be configured such that only a person having a special authority, such as an administrator, can set them.

FIG. 3 illustrates an example of electronic mail data transmitted and received by the MFP 200 and the SFP 300. The electronic mail data in FIG. 3 is configured from an E-mail header 700, an E-mail body 701, and attached image files (attachment image file) 702 and 703.

The E-mail header 700 is configured from a "Date" field for setting the transmission date and time, a "From" field for setting the electronic mail address of the sender, and a "To" field for setting the mail address of the receiver. Further, the E-mail header 700 also includes a "Subject" field for setting the subject of the electronic mail, and a "Message-ID" field for setting a unique identification (ID) that is generated based on the transmission date and time and the mail address of the sender device in order to identify the electronic mail data.

In addition, according to the present embodiment, the E-mail header 700 can be configured such that it includes a field ("X-Canon-Fax") for indicating transfer printing from the FAX apparatus 100. By adding the "X-Canon-Fax" field to the E-mail header 700 illustrated in FIG. 3, transfer printing from the FAX apparatus 100 can be indicated. If the "X-Canon-Fax" field attribute is added, the SFP 300 receiving the electronic mail data determines that the received electronic mail was transferred from the FAX apparatus 100 via the MFP 200, and prints only the attachment image file of the electronic mail data. On the other hand, if the "X-Canon-Fax" field attribute is "OFF", or if the "X-Canon-Fax" field attribute is not added to the E-mail header 700, both the electronic mail body and the attachment image file are printed.

When the MFP 200 utilizes the direct SMTP function to transmit electronic mail data including text data in the E-mail body to the SFP 300, this field attribute may be set to OFF.

Since E-mail data has to be information that can be read in 7-bit code, if the attachment image file is binary data it cannot be transmitted as is. Therefore, the E-mail body and the attachment image files 702 and 703 are transmitted by converting the data into a multipurpose Internet mail extension (MIME) format. The MIME version is set by the "MIME-Version" field in the E-mail header 700. Various data attributes are set in a "Content-Type" field of the E-mail body 701 and the attachment image files 702 and 703. A coding method of the data is set in a "Content-Transfer-Encoding" field.

In the present embodiment, the E-mail body 701 is configured from "ISO-2022-JP" language system text data.

In the present embodiment, the attachment image file 702 is configured from image data in a tagged image file format (TIFF) that uses a coding method called "base 64".

The attachment image file 703 is configured from image data in a joint photographic experts group (JPEG) format that uses the same "base 64" coding method.

In the present embodiment, the two attachment image files 702 and 703 are attached to the electronic mail. However, the number of image files attached to the electronic mail and the compression format of the attachment image files are not especially limited. In a case of a TIFF format, the attachment image file can be configured from multiple pages in which a plurality of images are stored in a single file. Consequently, image printing of a plurality of pages can be realized by sending one attachment image file in the electronic mail.

For example, in addition to image files in a TIFF format or a JPEG format, a portable document format (PDF) file may also be attached to the electronic mail.

FIG. 4 illustrates a printing example of the E-mail body and the attachment image file of the electronic mail data illustrated in FIG. 3.

In FIG. 4, the images are printed one by one. The E-mail body 701 is printed at the first page, the attachment image file 702 is printed at the second page, and the attachment image file 703 is printed at the third page.

In addition, if the "X-Canon-Fax" field indicating transfer printing from the FAX apparatus 100 described in FIG. 3 is not added or if the "X-Canon-Fax" field attribute is OFF, the electronic mail body 701 and the attachment image files 702 and 703 are printed.

On the other hand, if the "X-Canon-Fax" field attribute is "ON", printing of the E-mail body 701 is omitted, and just the attachment image files 702 and 703 are printed.

By referring to whether this field is ON or OFF, it can be determined whether to omit the printing of the E-mail body 701 in non-existent electronic mail data when transmitting image data from the FAX apparatus 100 to the MFP 200.

Figure 5:
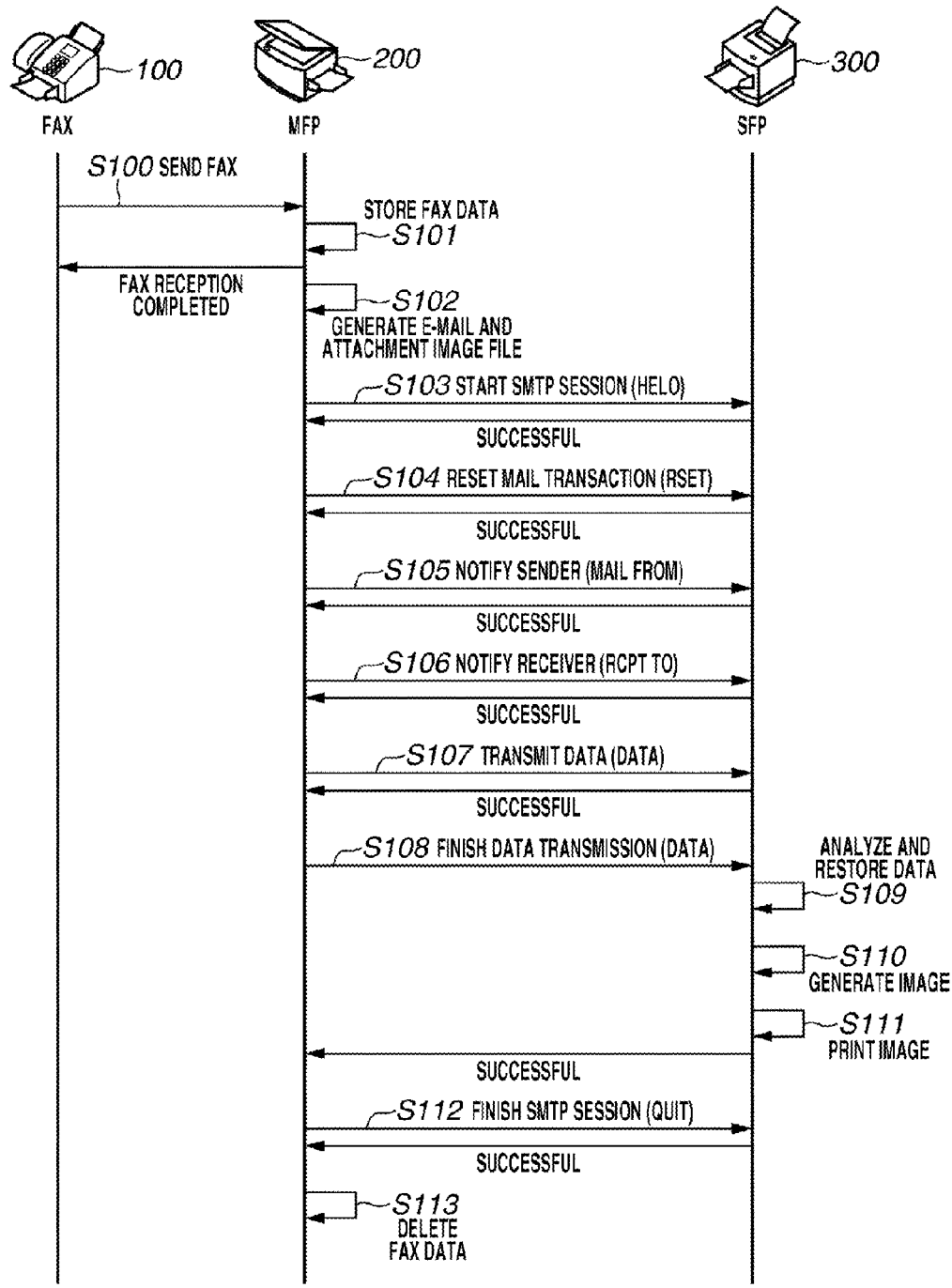
FIG. 5 is a sequence diagram among a FAX apparatus, an MFP, and an SFP.

FIG. 5 illustrates the basic operation sequence among the FAX apparatus 100, the MFP 200, and the SFP 300. The sequence in FIG. 5 is an operation procedure for transferring facsimile data received from the FAX apparatus 100 by the MFP 200 to the SFP 300 by electronic mail, and printing the transferred data with the SFP. The sequence illustrated in FIG. 5 is described assuming that the facsimile data received by the MFP 200 matches a transferring condition to the SFP 300, the amount of toner required for printing by the print engine unit 315 in the SFP 300 is sufficient to perform printing normally.

In step S100, the facsimile data transmitted from the FAX apparatus 100 is received by the MFP 200 based on a known facsimile procedure. In step S101, the facsimile data is temporarily stored in the non-volatile memory 218 of the MFP 200, and the completion of reception is notified to the FAX apparatus 100.

In step S102, the electronic mail data and attachment image files are generated for transfer to the SFP 300.

The attachment image files are generated based on the facsimile data stored in step S101, and are configured from an image file in a TIFF format or a JPEG format.

In steps S103 to S108 and step S112, the electronic mail data and the attachment image files generated in step S102 are transmitted via SMTP commands.

Although a detailed description of the SMTP commands and their contents is omitted in the present embodiment, in the command indicating finishing of data transmission in step S112, the completion of printing is notified by returning a message indicating "success" after the below-described printing processing has been completed.

In step S109, the SFP 300 analyzes the electronic mail data received in a MIME format, and restores the E-mail body 701 and attachment image files 702 and 703 by decoding.

In step S110, the SFP 300 generates an image for printing based on the restored E-mail body 701 and attachment image files 702 and 703.

In step S111, the SFP 300 prints the generated image. In step S112, the SFP 300 returns an SMTP session finish command (QUIT) as a response to the data finish command. When the MFP 200 receives the SMTP session finish command, after the printing of all pages of the SMTP session finish command has been completed, the MFP 200 notifies the SFP 300 that printing has been completed by returning a "successful" message in response to the command indicating data transmission finish in step S108.

In step S113, the MFP 200 confirms that the printing in step S108 has been completed, and then deletes the facsimile data that is temporarily stored in the non-volatile memory 218 of the MFP 200.

The above was a description of the operation sequence among the FAX apparatus 100, the MFP 200, and the SFP 300.

Figure 6:
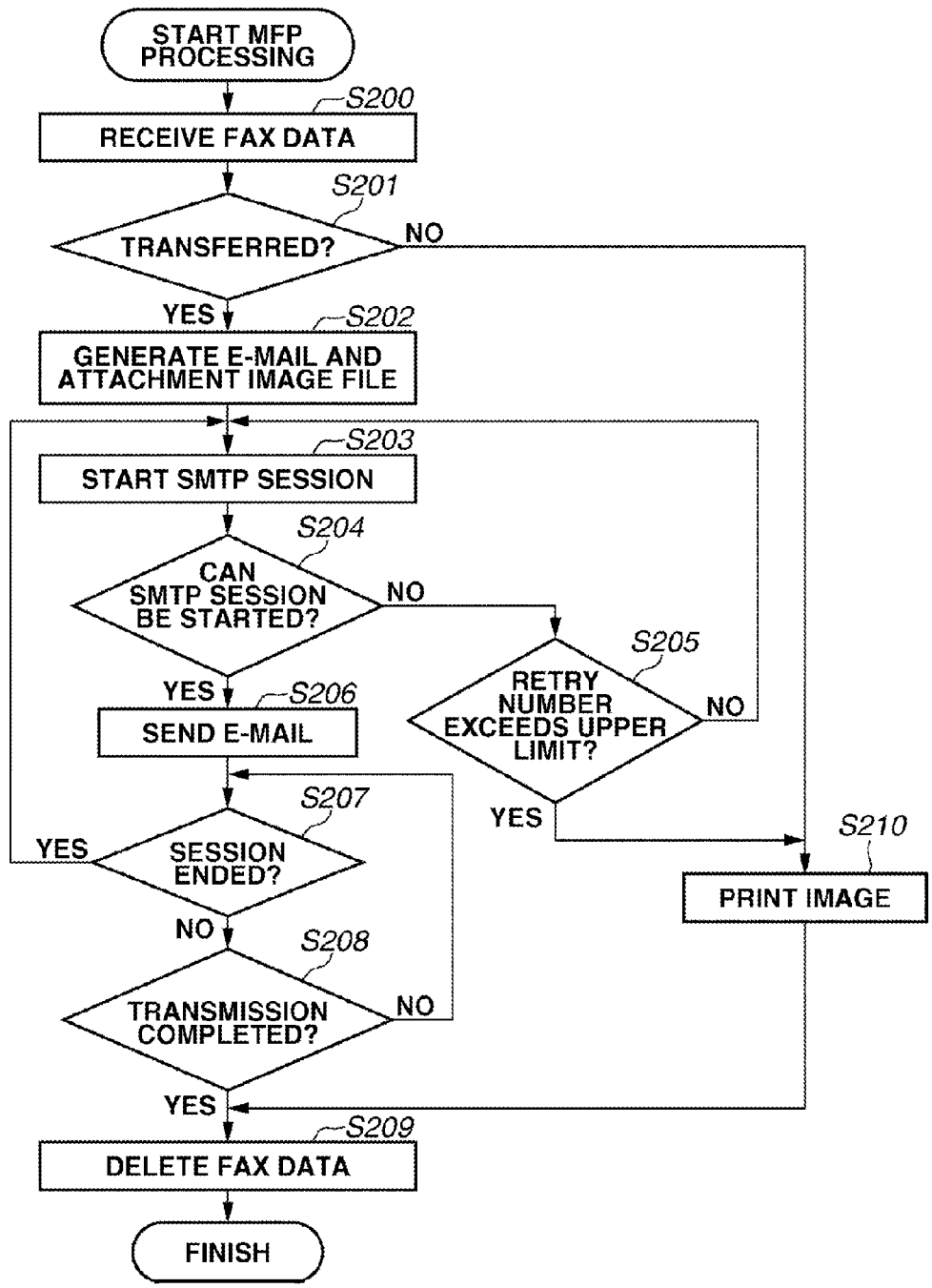
FIG. 6 is a flowchart illustrating the processing performed by the MFP of FIG. 1.

FIG. 6 is a flowchart illustrating the processing performed by the MFP 200. The control program code for executing the respective steps in this flowchart is stored in the ROM 216, and executed by the CPU 211.

First, in step S200, the MFP 200 receives facsimile data from the FAX apparatus 100 and stores the facsimile data in the non-volatile memory 218. This processing corresponds to steps S100 and S101 in FIG. 5.

In step S201, the CPU 211 determines whether the facsimile data was received with a transferring condition to one or a plurality of pre-registered SFPs. Specifically, the CPU 211 refers to the transfer setting table 230 illustrated in FIG. 2 to determine whether the FAX number when the facsimile data is received, matches any of the FAX numbers registered in the transfer setting table of FIG. 2, and determines whether a transfer setting to the SFP is set.

If it is determined in step S201 that a transfer setting is not set (NO in step S201), the processing proceeds to step S210. In step S210, the print engine unit 215 prints the facsimile data.

On the other hand, if it is determined in step S201 that a transfer setting is set (YES in step S201), in step S202, the CPU 211 generates electronic mail data for transmission to the transfer apparatus indicated by the IP address corresponding to the received FAX number. In the present embodiment, the following description will be based on the assumption that the apparatus to which the facsimile data is transmitted is the SFP 300 illustrated in FIG. 1.

The "X-Canon-FAX" field in the E-mail header 700 of the electronic mail data generated in step S202 is set to "ON". Further, the electronic mail data is generated such that the format of the attachment image files can be printed by the SFP 300 (e.g., a TIFF format or a JPEG format).

In step S203, the CPU 211 starts an SMTP session for transmitting the electronic mail data to the IP address of the transfer apparatus. This processing corresponds to step S103 in FIG. 5.

In step S204, the CPU 211 determines whether it was possible to start the SMTP session. If the session could not be started (NO in step S204), the CPU 211 determines that the electronic mail data cannot be transmitted to the SFP 300, and after a predetermined time period has elapsed the CPU 211 again issues a request to start a SMTP session. This session start request is repeated the number of times indicated by the transfer retry number corresponding to the IP address of the transfer apparatus illustrated in FIG. 2.

In step S205, the CPU 211 determines whether the number of retries has reached the transfer retry number (upper limit) in FIG. 2. If it is determined that the upper limit has been reached (YES in step S205), the CPU 211 stops the transfer to the SFP 300 and the processing proceeds to step S210. In step S210, printing is performed by the MFP 200.

In step S206, the electronic mail data generated in step S202 is transmitted. This processing corresponds to step S107 in FIG. 5.

In step S207, the CPU 211 monitors whether the MFP 200 has switched from a state in which an SMTP session is established to a state in which an SMTP session is not established (whether the session has ended). If the session has ended in the middle of the electronic mail data transmission (YES in step S207), the processing returns to step S203 and electronic mail data transmission is performed from the start.

In step S208, the CPU 211 determines whether transmission is completed. If it is determined that electronic mail transmission has finished normally (YES in step S208), the processing proceeds to step S209. In step S209, the CPU 211 deletes the facsimile data that was temporarily stored in the RAM 217 and the non-volatile memory 218, and finishes the processing performed in this flowchart.

FIG. 7 is a flowchart illustrating the processing performed by the SFP 300. The control program for executing the respective steps in this flowchart is stored in the ROM. 316, and executed by the CPU 311. The processing illustrated in the flowchart of FIG. 7 is started based on the reception of data via the LAN 600 and the Ethernet® interface 319 from either the MFP 200 or the PC 400.

First, in step S300, the SFP 300 determines whether the data received by the Ethernet® interface 319 is electronic mail data or PDL data based on the protocol and a port number.

If it is determined that the received data is electronic mail data (YES in step S300), in step S301, the CPU 311 checks the "X-Canon-Fax" field included in the received electronic mail data by referring to the E-mail header 700 in the electronic mail data illustrated in FIG. 3 in order to determine whether the received data is electronic mail data transferred from the FAX apparatus 100 (FAX transfer) or is some other electronic mail data (e.g., electronic mail data that uses a direct SMTP function). If the "X-Canon-Fax" field is ON, the CPU 311 determines that the received data is a FAX transfer (YES in step S301), and the processing proceeds to step S302. On the other hand, if the "X-Canon-Fax" field is OFF or if this field is not added, the CPU 311 determines that the received data is not a FAX transfer (NO in step S301), and the processing proceeds to step S305.

Next, in step S302, the CPU 311 checks the toner remaining amount stored in the RAM 317. The acquired toner remaining amount was written in the RAM 317 when the print engine unit 315 collected the status at a predetermined timing as described above.

In step S303, the CPU 311 compares the toner remaining amount acquired in step S302 with a reference value (defined value) determined in advance by the SFP 300. The defined value for the toner remaining amount in the present embodiment indicates a stage at which faint printing due to an insufficient toner remaining amount does not occur, and is a reference for guaranteeing normal printing. If it is determined that the toner remaining amount is less than the predetermined reference value (defined value) by the SFP 300 (YES in step S303), in step S304, the CPU 311 refuses to receive the electronic mail data by transmitting a QUIT command as a response to the HELO command from the MFP 200. Then, the processing in this flowchart is finished. Consequently, printing of the electronic mail data transferred from the MFP 200 is restricted.

On the other hand, if it is determined in step S303 that the toner remaining amount is equal to or greater than the defined value, so that there is a guarantee that a output print product is not faint (NO in step S303), in step S305, the CPU 311 allows the SFP 300 to receive the data, and generates a print image based on the received data. If the received data is electronic mail data, the CPU 311 restores the E-mail body 701 and the attachment image files 702 and 703 by analyzing and decoding the MIME-format data and generates the print image.

If it is determined in step S301 that the received data is a FAX transfer, an image is generated without the E-mail body 701 portion of the electronic mail data. On the other hand, if the received data is PDL data, in step S305, the CPU 311 analyzes the PDL data, and generates a bitmap image based on the respective commands described in the PDL data.

In step S306, the image generated in step S305 is printed. In step S307, if the CPU 311 determines that printing of all the page images has been completed (YES in step S307), the processing in this flowchart is finished. On the other hand, if the CPU 311 determines that printing of all the page images has not yet been completed (NO in step S307), the processing proceeds to step S308.

In step S308, the CPU 311 determines whether the received data is electronic mail data. If it is determined that the received data is electronic mail (YES in step S308), the processing proceeds to step S309. In step S309, based on the received electronic mail data, the CPU 311 checks whether the received data is electronic mail data that was transmitted from the FAX apparatus 100 via the MFP 200. If it is determined that the received data is electronic mail data transmitted from the FAX apparatus 100 via the MFP 200 (YES in step S309), the processing proceeds to step S310. In step S310, the toner remaining amount is confirmed based on the same procedure as in step S302 when the image of each page is printed and discharged onto a discharge unit in the SFP 300.

In step S311, the CPU 311 determines whether the toner remaining amount is less than the defined value based on the same procedure as in step S303. If it is determined that the toner remaining amount is less than the defined value (YES in step S311), the CPU 311 stops printing of the electronic mail data, ends the SMTP session to notify the MFP 200, which is still transmitting the electronic mail data, that printing was unsuccessful. Further, the CPU 311 deletes the received electronic mail and the attachment image files, and finishes the processing performed in this flowchart.

When this notification is transmitted to the MFP 200, the MFP 200 attempts to transmit the data a number of times for retry indicated in the transfer setting table 230. If transmission is still unsuccessful even after these retries, proxy printing is performed.

If it is determined in step S308 that the printing is based on PDL data (NO in step S308), or determined in step S309 that the received data is not a FAX transfer (NO in step S309), the processing returns to step S305, and print image generation of the next page is continued.

In FIG. 7, the toner remaining amount is confirmed in steps S302 and S303 when the electronic mail data starts to be received, and in steps S308 and S309 while the electronic mail is being received on a page-by-page basis. Thus, when the toner is replenished, the toner remaining amount may vary and reception of the electronic mail data is restarted.

As described above, according to the present embodiment, reception/printing are restricted based on whether the data received by the Ethernet interface 319 is electronic mail data or PDL data. Consequently, when an electronic mail is received, faint printing is prevented by stopping reception and printing, while if the received data is PDL data, reception and printing are continued.

Further, in the present embodiment, when the toner remaining amount in the SFP 300 is less than the defined value, an SMTP session start request is refused as the method for restricting printing based on the electronic mail data from the MFP 200. Specifically, the electronic mail data per se is not received by the SFP 300. Consequently, a situation in which the electronic mail data is left stored in the SFP 300 without being printed can be prevented.

In the flowchart of FIG. 7, whether the received electronic mail data was transferred from the FAX apparatus 100 is determined (see step S301). Then based on this determination, it is determined whether print processing is performed confirming the toner remaining amount or without confirming the toner remaining amount (see steps S302 and S303). However, if the received data is electronic mail data, the processing of step S302 may be performed across the board without performing the above-described determinations. Thus, the contents of the E-mail header 700 in the received electronic mail data do not have to be analyzed, so that faster processing can be performed.

Further, in the present embodiment, to determine whether the received electronic mail was transferred from the FAX apparatus 100, the E-mail header 700 of the electronic mail data illustrated in FIG. 3 is referred to (see step S301). However, this determination may be made in a different way. For example, the determination can be made based on whether the electronic mail was received in the procedure illustrated in FIG. 5 (i.e., SMTP protocol procedure), or whether the electronic mail was received from a post office protocol (POP) 3 server, for example. In this case, if the electronic mail was received in the procedure illustrated in FIG. 5, in step S301 it is determined to be "YES", while if the electronic mail was received from a POP sever, in step S301 it is determined to be "NO".

The image forming system according to the present embodiment is configured such that facsimile data from the FAX apparatus 100 is transferred by the MFP 200 based on an SMTP protocol. Consequently, on the SFP 300 side, when the received data is received based on the SMTP protocol, the received data is determined to be a FAX transfer (see step S300 and S301). However, if the protocol used by the MFP 200 to transfer the data to the SFP 300 is not SMTP, but is some other protocol (e.g., file transfer protocol (FTP)), it may be determined that the received data is a FAX transfer based on that other protocol.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to embodiments, it is to be understood that the invention is not limited to the disclosed embodiments. It will of course be understood that this invention has been described above by way of example only, and that modifications of detail can be made within the scope of this invention.

What is claimed is:

1. A system comprising:
a first image forming apparatus; and
a second image forming apparatus,
wherein the first image forming apparatus comprises:
a first control unit;
a first image forming unit;
a first receiving unit configured to receive data; and
a transferring unit configured to transfer the data received by the first receiving unit to the second image forming apparatus,
wherein the second image forming apparatus comprises:
a second receiving unit configured to receive the data transferred from the first image forming apparatus;
a second image forming unit configured to perform image forming based on the data received by the second receiving unit; and
a second control unit configured to perform notification to the first image forming apparatus on the basis that it is determined that a remaining amount of toner used by the second image forming unit for performing the image forming is less than a predetermined value, and wherein the first control unit controls the first image forming unit to perform the image forming based on the data received by the first receiving unit in response to reception of the notification from the second image forming apparatus.

2. The system according to claim 1, wherein, in a case where the remaining amount of toner used by the second image forming unit for performing the image forming is less than the predetermined value, the second control unit performs the notification as a response to a communication establishment request received from the first image forming apparatus, and wherein, in response to reception of the notification from the second image forming apparatus, the first control unit controls the first image forming unit to perform the image forming based on the data received by the first receiving unit without the transferring of the data by the transferring unit.

3. The system according to claim 1, wherein, in a case where the remaining amount of toner used by the second image forming unit for performing the image forming is less than the predetermined value, the second control unit performs the notification as a response to the transferring of the data from the first image forming apparatus, and wherein, in response to reception of the notification from the second image forming apparatus, the first control unit stops the transferring of the data by the transferring unit and controls the first image forming unit to perform the image forming based on the data received by the first receiving unit.

4. The system according to claim 1, wherein the first image forming apparatus further comprises a storage unit configured to store the data received by the first receiving unit, and wherein, in response to reception of the notification from the second image forming apparatus, the first control unit controls the first image forming unit to perform the image forming based on the data stored in the storage unit.

5. The system according to claim 4, wherein the first image forming apparatus further comprises a deleting unit configured to delete the data stored in the storage unit after the transferring of the data by the transferring unit is completed.

6. The system according to claim 1, wherein, in a case where the remaining amount of toner used by the second image forming unit for performing the image forming is less than the predetermined value, the second control unit performs the notification to the first image forming apparatus without performing of the image forming by the second image forming unit.

7. The system according to claim 6, wherein the second image forming unit is further configured to perform image forming based on data different from the data transferred from the first image forming apparatus, and wherein, even when the remaining amount of toner used by the second image forming unit for performing the image forming is less than the predetermined value, the second control unit controls the second image forming unit to perform image forming for the data different from the data transferred from the first image forming apparatus.

8. The system according to claim 1, wherein the data received by the first receiving unit is facsimile data.

9. The system according to claim 8, wherein the data transferred by the transferring unit is data converted from the facsimile data into e-mail data.

10. The system according to claim 1, wherein in a case where data is received by the receiving unit, the first control unit determines whether to transfer the data to the second image forming apparatus or to perform printing based on the data in the first image forming apparatus.

11. A first image forming apparatus comprising:
a first control unit;
a first image forming unit;
a first receiving unit configured to receive data; and
a transferring unit configured to transfer the data received by the first receiving unit to a second image forming apparatus,
wherein the second image forming apparatus comprises:
a second receiving unit configured to receive the data transferred from the first image forming apparatus;
a second image forming unit configured to perform image forming based on the data received by the second receiving unit; and
a second control unit configured to perform notification to the first image forming apparatus on the basis that it is determined that a remaining amount of toner used by the second image forming unit for performing the image forming is less than a predetermined value, and
wherein the first control unit controls the first image forming unit to perform the image forming based on the data received by the first receiving unit in response to reception of the notification from the second image forming apparatus.

* * * * *